(12) United States Patent
Erxmeyer et al.

(10) Patent No.: US 9,297,936 B2
(45) Date of Patent: Mar. 29, 2016

(54) MIRROR WITH DIELECTRIC COATING

(71) Applicant: Carl Zeiss Laser Optics GmbH, Oberkochen (DE)

(72) Inventors: Jeffrey Erxmeyer, Oberkochen (DE); Alexandra Pazidis, Essingen-Lautenburg (DE); Horst Feldermann, Aalen (DE)

(73) Assignee: Carl Zeiss Laser Optics GmbH, Oberkochen (DE)

( * ) Notice: Subject to any disclaimer, the term of this patent is extended or adjusted under 35 U.S.C. 154(b) by 0 days.

(21) Appl. No.: 13/686,101

(22) Filed: Nov. 27, 2012

(65) Prior Publication Data

US 2013/0083411 A1  Apr. 4, 2013

Related U.S. Application Data

(63) Continuation of application No. PCT/EP2011/058642, filed on May 26, 2011.

(30) Foreign Application Priority Data

May 27, 2010 (DE) .......... 10 2010 017 106

(51) Int. Cl.
*G02B 5/08* (2006.01)
*G02B 5/26* (2006.01)
*G02B 5/28* (2006.01)

(52) U.S. Cl.
CPC ............ *G02B 5/08* (2013.01); *G02B 5/0833* (2013.01); *G02B 5/0891* (2013.01); *G02B 5/284* (2013.01)

(58) Field of Classification Search
CPC .......... G02B 5/08; G02B 1/04; G02B 5/0816; G02B 5/0866; G02B 5/0858; G02B 5/0875; G02B 5/0284; G02B 5/0825; G02B 7/00
USPC .......................... 359/838, 839, 871, 883, 884
See application file for complete search history.

(56) References Cited

U.S. PATENT DOCUMENTS

| 6,574,039 B1 | 6/2003 | Murata et al. |
| 2003/0137672 A1 | 7/2003 | Moriya et al. |

(Continued)

FOREIGN PATENT DOCUMENTS

| DE | 102008042439 A1 | 4/2010 |
| DE | 102010002359 A1 | 9/2010 |

(Continued)

OTHER PUBLICATIONS

International Preliminary Report on Patentability (English translation) dated Nov. 27, 2012.

(Continued)

*Primary Examiner* — Jade R Chwasz
(74) *Attorney, Agent, or Firm* — Edell, Shapiro & Finnan, LLC (57) ABSTRACT

A mirror with a dielectric coating (2) on a substrate (3), wherein the dielectric coating (2) has exactly two layer stacks (4, 5), a first layer stack (4), on the substrate, of layers (41, 42) of high refractive index and low refractive index oxides in alternating arrangement and a second layer stack (5), arranged thereon, of layers of fluorides (52) and oxides (51) in alternating arrangement, and wherein the number of fluoride layers (52) as a proportion of the total number of layers of the dielectric coating (2) is less than 0.45.

18 Claims, 6 Drawing Sheets

(56) References Cited

U.S. PATENT DOCUMENTS

| | | | |
|---|---|---|---|
| 2005/0018301 A1* | 1/2005 | Uehara | 359/586 |
| 2007/0236799 A1 | 10/2007 | Tateno | |
| 2008/0204862 A1 | 8/2008 | Wang et al. | |
| 2008/0247044 A1* | 10/2008 | Kuwabara | 359/580 |
| 2010/0215932 A1 | 8/2010 | Schreiber et al. | |

FOREIGN PATENT DOCUMENTS

| | | | | |
|---|---|---|---|---|
| EP | 1152263 | A1 | 11/2001 | |
| EP | 1749222 | B1 | 2/2007 | |
| JP | 02182447 | | 7/1990 | |
| JP | H02182447 | A | 7/1990 | |
| JP | H0312605 | * | 1/1991 | G02B 1/10 |
| JP | H0312605 | A | 1/1991 | |
| JP | 08-254612 | | 10/1996 | |
| JP | I-1116906 | A | 1/1999 | |
| JP | 2005259949 | A | 9/2005 | |
| JP | 2008117932 | A | 5/2008 | |
| WO | 2005114266 | A1 | 12/2005 | |
| WO | 2010034367 | A1 | 4/2010 | |

OTHER PUBLICATIONS

German Examination Report dated Oct. 12, 2010, and English translation.

Office Action in corresponding Japanese Application No. 2013-511684, dated Feb. 3, 2015, along with an English translation.

Office Action in corresponding Japanese Application No. 2013-511684, dated Dec. 15,2015, along with an English language translation.

* cited by examiner

MIRROR WITH DIELECTRIC COATING

This is a Continuation of International Application PCT/EP2011/058642, with an international filing date of May 26, 2011, which was published under PCT Article 21(2) in German, and the complete disclosure of which is incorporated into this application by reference. Also incorporated herein by reference in its entirety is the German priority application DE 10 2010 017 106,9, filed on May 27, 2010.

FIELD OF AND BACKGROUND OF THE INVENTION

The present invention relates to a mirror with a dielectric coating on a substrate. The invention further relates to an etalon comprising two such plane-parallel mirrors.

Mirrors having a dielectric coating on a substrate are often used in particular when a process involves ultraviolet radiation. The dielectric coating has low refractive index and high refractive index dielectric layers in alternating arrangement. Depending on layer thicknesses, they have particularly high reflectivities at specific wavelengths. High refractive index and low refractive index are to be understood in the present case as the relative refractive index difference at the wavelength at which the respective mirror is used. By way of example, the material of a layer of a dielectric coating that is referred to as low refractive index has a lower refractive index at the wavelength for which the dielectric coating has a particularly high reflectivity than the material of the layer of said dielectric coating that is referred to as high refractive index and is arranged in alternating fashion therewith.

Dielectric mirrors are used, inter alia, in microlithography with ultraviolet radiation, in particular at wavelengths between 157 nm and 365 nm. For example, WO 2010/034367 A1 discloses a dielectric mirror, which has at least one oxidic layer stack of low refractive index and high refractive index oxides and at least one fluoridic layer stack of low refractive index and high refractive index fluorides, wherein at least one mixed layer stack of an alternating sequence of oxidic and fluoridic layers is placed between the oxidic and the fluoridic layer stack. Said dielectric mirror at the same time has a high reflectivity with at the same time low stress induced by the dielectric coating.

A further field of use for mirrors with dielectric coating are lasers, in particular excimer lasers, which emit at wavelengths between 157 nm and 365 nm. The exact wavelength is monitored using Fabry-Pérot interferometry. To this end, two plane-parallel mirrors with dielectric coating are used to form, by way of spacers, an etalon, into which a partial ray of the radiation emitted by the laser is radiated and reflected to and fro between the two mirrors. In dependence on the distance between the two mirrors, the rays emerging from the etalon have different path differences and form different interference patterns. Therefrom, the wavelength of the radiation emitted by the laser can be determined. If it deviates from the predefined wavelength, the laser can be readjusted.

OBJECTS AND SUMMARY

One object of the present invention is the provision of a mirror with dielectric coating, which is suitable in particular for use in an etalon.

This object is achieved by a mirror with a dielectric coating on a substrate, wherein the dielectric coating has exactly two layer stacks, a first layer stack, on the substrate, of layers of high refractive index and low refractive index oxides in alternating arrangement and a second layer stack, arranged thereon, of fluorides and oxides in alternating arrangement, and wherein the number of fluoride layers as a proportion of the total number of layers of the dielectric coating is less than 0.45, preferably 0.35, particularly preferably 0.30.

It has been found that, owing to the combination of the first oxidic stack and second mixed oxide-fluoride stack, with not too high a proportion of fluoride layers being present overall, a mirror is provided which has a high reflectivity at a desired wavelength while still ensuring sufficient transmission in order to permit, when the mirror is used in an etalon, sufficient intensity of the emerging partial rays so as to permit interferometric measurements to be carried out with good resolution of the wavelength. In addition, any tensile stresses in the mixed layer stack can be compensated for by compressive stresses in the oxidic layer stack, such that the formation of cracks in the dielectric coating can be avoided.

The mirror preferably has an absorption of less than 2%, particularly preferably of less than 1.5%, very particularly preferably of less than 1%. With reflectivity remaining constant, reduced absorption translates into increased transmission, which increases the functionality of an etalon composed of such mirrors. In particular it is possible to carry out the interferometric control measurements with respect to the wavelength of a laser with partial rays of lower intensity.

The mirror preferably has a maximum reflectivity between 93% and 97%, particularly preferably between 94% and 97%. A maximum reflectivity in this region permits a maximum number of reflections of the partial rays between two mirrors of an etalon with the abovementioned dielectric coating without reducing the transmission to an insufficient extent. A high number of reflections within an etalon has the advantage of enabling the determination of wavelengths or of deviations from a predefined wavelength with a very high resolution.

The mirror advantageously has a substrate made of quartz glass. In principle, other substrate materials which have relatively good transmission also or in particular in the ultraviolet wavelength range, such as calcium fluoride, are also suitable. The particular advantage of quartz glass as the substrate material is that it is readily available. In addition, the arrangement of first an oxidic stack on the substrate has a particularly positive effect. The oxide layers have similar stress values and coefficients of thermal expansion as a quartz glass substrate, such that the risk of crack formation in the dielectric coating is minimized.

It has proven advantageous if the fluoride layers in the second layer stack are made of low refractive index fluoride, while the oxide layers are made of a high refractive index oxide. Thus it is possible to achieve between the alternating layers of the mixed layer stack a particularly high refractive index difference and thus a particularly high optical contrast, which has a positive effect on reflectivity. Suitable low refractive index fluorides are for example magnesium fluoride, sodium fluoride or aluminum fluoride.

The mirror preferably has magnesium fluoride as fluoride layers and aluminum oxide and/or silicon dioxide as oxide layers. It is possible in particular in the more short-wave ultraviolet range by way of these materials to achieve both high reflectivities and high transmissions, which is why mirrors with dielectric coatings made of these materials are particularly well suited for use in etalons.

In preferred embodiments, the second layer stack of the dielectric coating of the mirror has two sub-stacks, wherein the first sub-stack has alternating layers of a fluoride and of a first oxide, and the second sub-stack has alternating layers of the fluoride and a second oxide. It is possible in this manner to further optimize the coating for a high reflectivity with at the same time high transmission. The oxides are here particularly preferably chosen such that in the sub-stack which is further remote from the substrate an oxide with lower absorption at the desired wavelength is selected, while for the sub-stack therebelow the oxide is primarily selected with a view to said oxide having a particularly large refractive index difference with respect to the fluoride layer so as to maximize the reflectivity and also at the same time minimize the absorption by way of the configuration of the sub-stacks.

In a further preferred embodiment, the second layer stack of the dielectric coating of the mirror likewise has two sub-stacks, wherein the first sub-stack has alternating layers of a fluoride and two oxides, and the second sub-stack has alternating layers of the fluoride and one of the two oxides. It has been found that it is possible with periods of three layers, that is to say a fluoride layer and two oxide layers in the first sub-stack which is preferably arranged closer to the substrate than the second layer stack, to likewise achieve very good reflectivities with at the same time good transmission.

At the transitions between substrate and oxidic stack or between oxidic and mixed stack or, if appropriate, between two mixed sub-stacks or else as terminating layer of the dielectric coating, individual layers can be provided, which serve for example the optical adaptation or the adaptation of the layer stresses. However, preferably the dielectric coating consists of the first and second layer stacks without adaptation layers.

In preferred embodiments, the mirror has, as the layer that is the most remote from the substrate, a layer of aluminum oxide. Aluminum oxide has the advantage of being particularly inert, such that an outermost layer made of aluminum oxide serves in a sense as a protective layer for the layers below it and increases the lifetime of the mirror.

Furthermore, the object is achieved by an etalon made of two plane-parallel mirrors as described above.

The aforementioned and further features can be gathered not only from the claims but also from the description and the drawings, wherein the individual features can be embodied alone or in groups in the form of sub-combinations in one embodiment of the invention and in other areas, respectively, and can represent advantageous embodiments and embodiments which are capable of being protected themselves.

BRIEF DESCRIPTION OF THE DRAWINGS

The present invention will be explained in further detail with reference to a preferred exemplary embodiment. In the figures.

DETAILED DESCRIPTION

Figure 1:
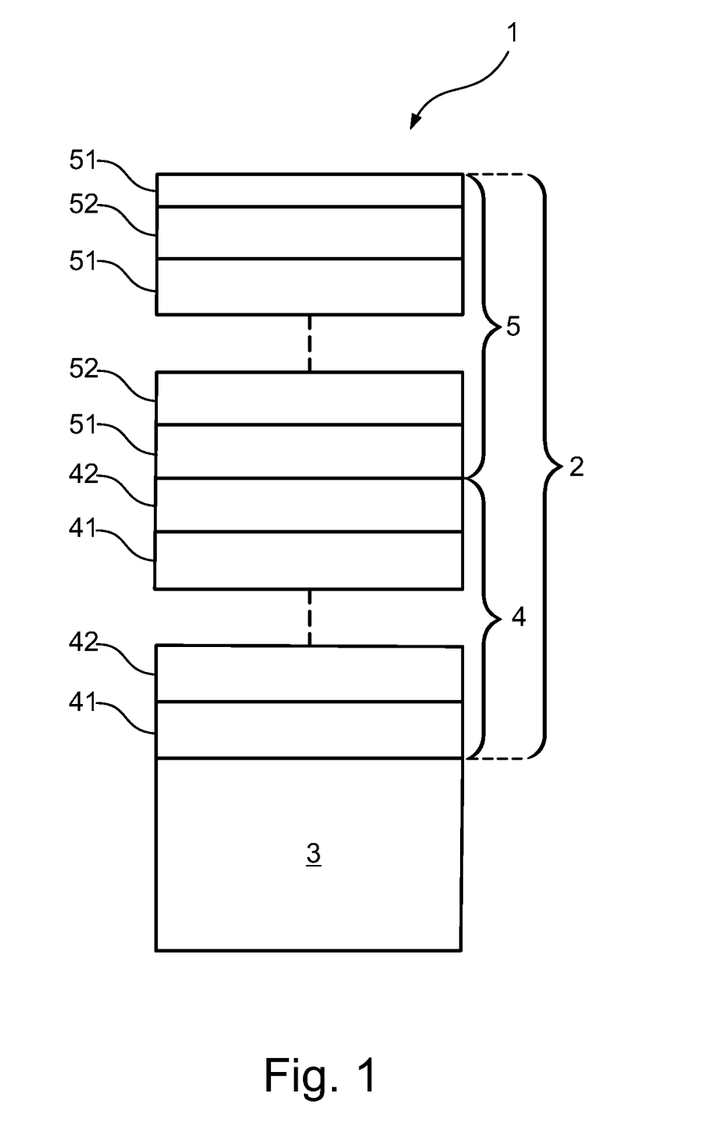
FIG. 1 schematically shows a first embodiment of the mirror with dielectric coating.

FIG. 1 schematically shows a first embodiment of a mirror 1 with a dielectric coating 2 on a substrate 3, in which the dielectric coating 2 comprises exactly two layer stacks 4, 5, specifically a first layer stack 4 on the substrate 3 of layers 41, 42, in alternating arrangement, of high refractive index and low refractive index oxides, and a second layer stack 5, arranged thereon, of layers 51, 52 of oxides and fluorides in alternating arrangement, wherein the number of fluoride layers 52 as a proportion of the total number of layers of the dielectric coating in this example is less than 0.35.

In a preferred variant, the substrate 3 is made of quartz glass. Quartz glass is transparent even in the ultraviolet wavelength range, such that the mirror 1 with quartz glass substrate is suitable inter alia for etalons for the ultraviolet wavelength range, in which radiation must be able not only to penetrate the dielectric coating but also the substrate in order to pass into the inside of the etalon between the two reflective surfaces and to emerge therefrom again.

Since the layer stack 4 applied on the substrate 3 is constructed from purely oxidic layers 41, 42, the coefficient of thermal expansion of the substrate 3 is comparable to that of the layer stack 4, in particular if it also has silicon dioxide as the oxide. In addition, the adhesion of oxidic layers on a quartz glass substrate is good. It is possible using the oxidic stack 4 for tensile stresses, which can occur in the mixed layer stack 5 of fluoride layers 52 and oxide layers 51, to be compensated for by corresponding compressive stresses in the layer stack 4. The individual layers can be applied using any desired conventional coating methods. Tensile stresses in the mixed stack 5 can be compensated for particularly well by the oxide layers 41, 42 of the layer stack 4, which were applied in a plasma-enhanced fashion.

It should be pointed out that in the example illustrated in FIG. 1, both layer stacks begin with a high refractive index layer 41, 51 on its side that faces the substrate 3. The layer stack 4 ends with a low refractive index oxide layer 42, the layer stack 5 ends with a high refractive index oxide layer 51. In further variants, this can also be reversed in one or the other stack. The one or other stack can also begin and end with a low refractive index layer or a high refractive index layer.

The layer stack 5 preferably ends with a chemically inert layer of aluminum oxide, in order to protect the remaining layers of the coating 2 against external influences and to increase the lifetime of the mirror 1. Here, the outermost layer of aluminum oxide can be part of the layer stack 5 or can be arranged additionally thereon.

Figure 2:
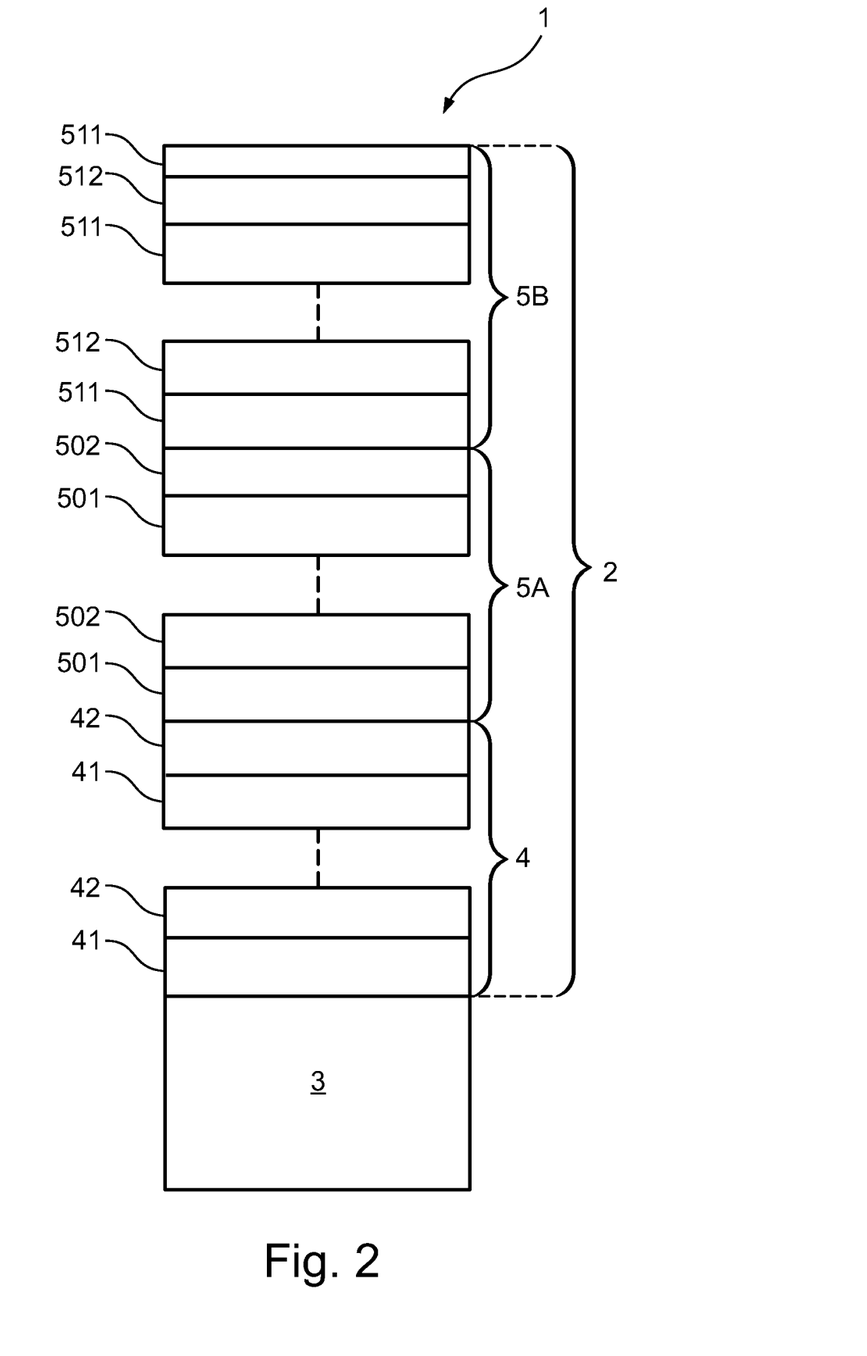
FIG. 2 schematically shows a second embodiment of the mirror with dielectric coating.

FIG. 2 illustrates a further embodiment of the mirror 1 with dielectric coating 2. The example illustrated here differs from the embodiment illustrated in FIG. 1 in that the second layer stack has two sub-stacks 5A, 5B, wherein the first sub-stack 5A has alternating layers 501, 502 of a first oxide 501 and a fluoride 502, and the second sub-stack 5B has alternating layers 511, 512 of a second oxide 511 and the fluoride 512, which in the example illustrated here matches the fluoride 502 from the first sub-stack 5A. With respect to the embodiment from FIG. 1, it is thus possible for both the reflectivity and at the same time the absorption to be optimized by selecting in the sub-stack 5A, which is situated closer to the substrate 3, the oxide with a view to an optical contrast being achieved that is as high as possible with respect to the fluoride layer 502, while in the sub-stack 5B, which terminates the dielectric coating 2, the oxide is selected with a view to the absorption being as low as possible.

In variants of the embodiment illustrated in FIG. 2 which are not shown here, it is also possible for the fluoride, and not the oxide, to be varied in the two sub-stacks. Likewise it is possible in the two sub-stacks for both the oxides and the fluorides to be varied. It should furthermore be pointed out that the mixed layer stack of oxide layers and fluoride layers can also have three, four, five or more sub-stacks. It is likewise possible for the oxidic layer stack to have two, three, four, five or more sub-stacks of different oxides.

Figure 3:
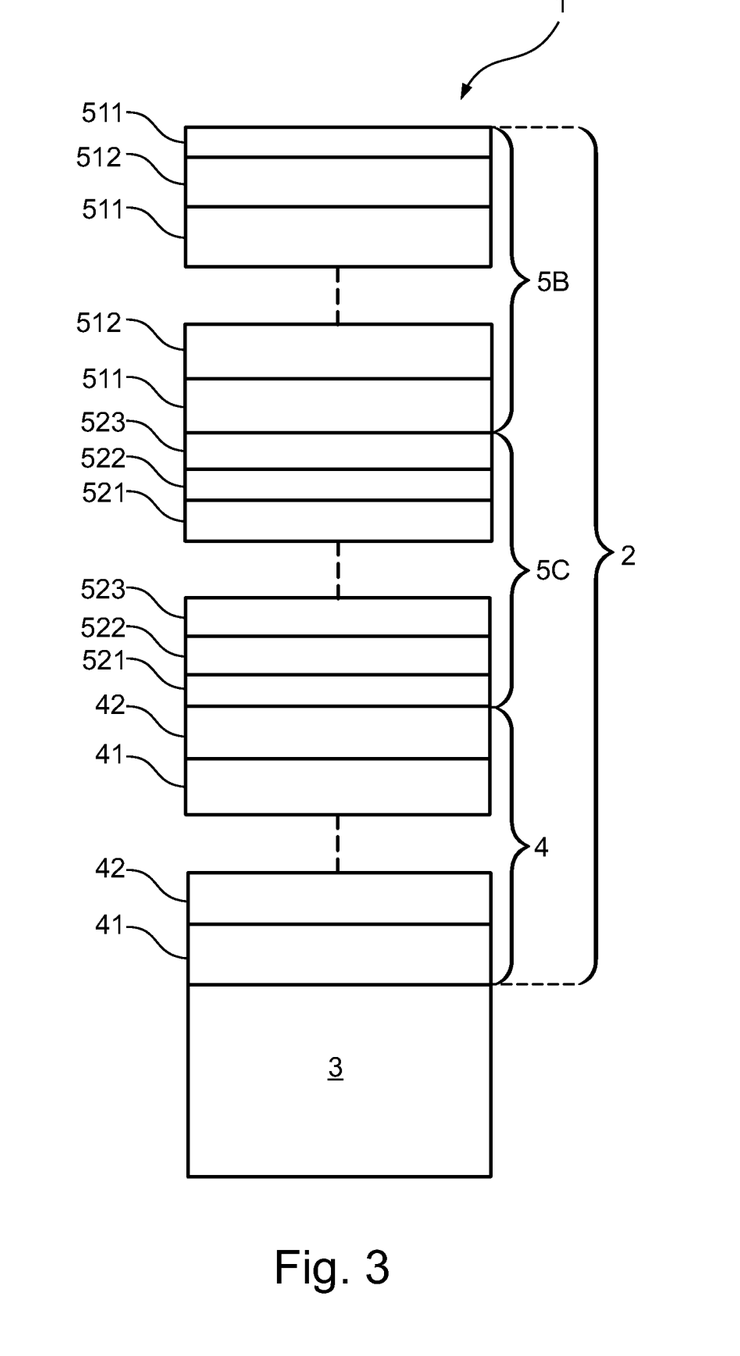
FIG. 3 schematically shows a third embodiment of the mirror with dielectric coating.

FIG. 3 schematically illustrates a third embodiment of the mirror 2 with dielectric coating, which differs from the embodiment illustrated in FIG. 2 in that the second layer stack has two sub-stacks 5C, 5B, wherein the first sub-stack 5C has alternating layers 521, 522, 523 of a fluoride 523 and two oxides 521, 522, and the second sub-stack 5B has alternating layers 511, 512 of the fluoride 512 and one of the two oxides 511 as in the first sub-stack 5C. It is possible to achieve high reflectivities at desired wavelengths with at the same time low absorption even with sub-stacks that have periods of three layers.

It should be pointed out that in further variants it is also possible for the second sub-stack 5B or all sub-stacks to have periods of three layers. The oxidic layer stack 4 can also have periods of three layers. Furthermore, both the fluoride and the oxides in the sub-stacks 5C, 5B can differ. In principle, it is also possible for periods with four or more layers to be provided.

For good reflectivity in particular in the wavelength range around 193 nm, a mirror was produced in principle according to the embodiment illustrated in FIG. 2. To this end, first an oxidic layer stack of ten alternating layers of aluminum oxide as a high refractive index layer and silicon oxide as a low refractive index layer, beginning with aluminum oxide, was applied in a plasma-enhanced fashion on a substrate made of quartz glass. Ten alternating layers of aluminum oxide as a high refractive index layer and magnesium fluoride as a low refractive index layer were applied thereon, which form a first sub-stack. Subsequently, five alternating layers of silicon oxide as a high refractive index layer and magnesium fluoride as a low refractive index layer were applied as a second sub-stack. The three silicon oxide layers in the second sub-stack and the five aluminum oxide layers in the first sub-stack were applied in a plasma-enhanced fashion, while the seven magnesium fluoride layers were applied using electron beam evaporation. The ratio of the number of magnesium fluoride layers to the total number of layers over the entire dielectric coating was approximately 0.28. The layer thicknesses were optimized using conventional simulation programs for a maximum reflectivity at 193 nm.

Figure 4A:
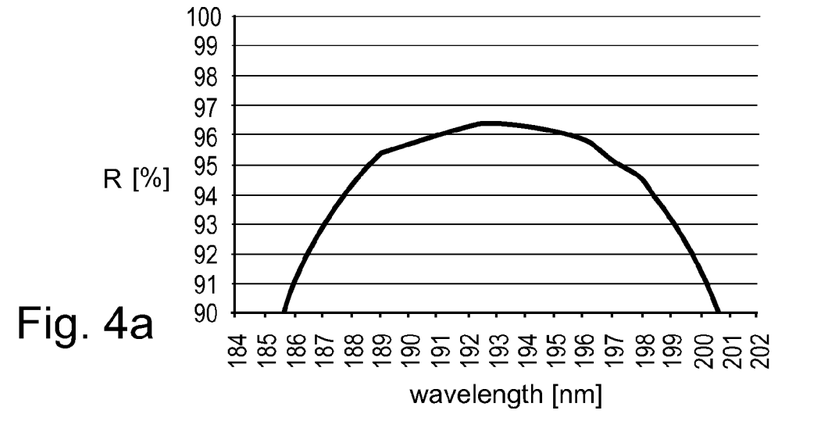
FIGS. 4a-c show the measurement of the reflectivity and of the transmission in a mirror according to the second embodiment and the determination of its absorption as a function of the wavelength.

The reflectivity of this mirror was measured with substantially normal incidence over a wavelength range from 184 nm to 202 nm. The results are illustrated in FIG. 4a. In a range between approximately 187 nm and approximately 199 nm, a reflectivity of 93% and more was achieved, in a range between approximately 188 nm and approximately 198 nm, a reflectivity of 94% and more was achieved, in a range between about 191 nm and about 195 nm, a reflectivity of 96% and more is achieved with a maximum of just under 96.5% at 193 nm.

Figure 4B:
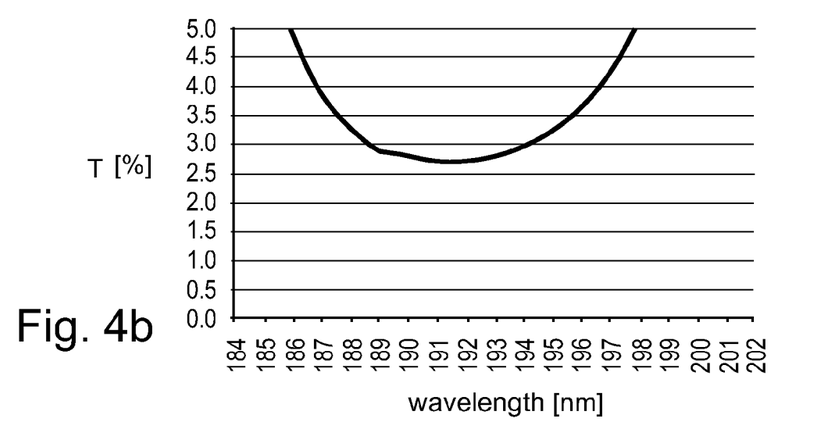
Figure 4C:
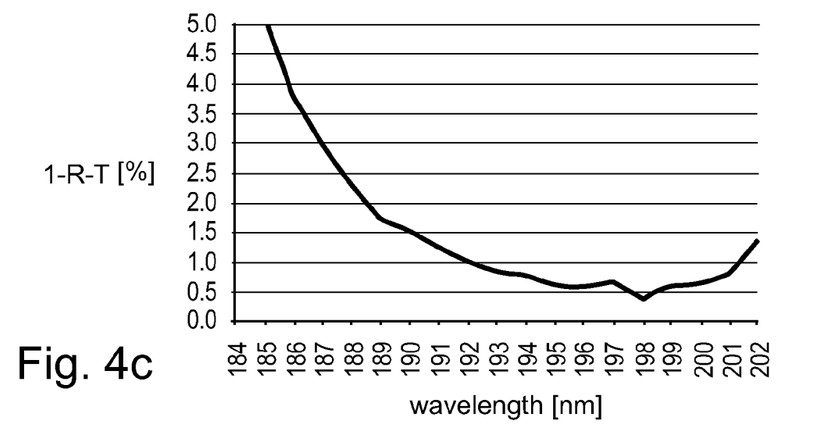

A parallel measurement of the transmission of the mirror was carried out with the same boundary conditions. This is illustrated in FIG. 4b. Even in the range of highest reflectivity around 193 nm, the transmission is significantly more than 2%. It is possible from the measurements of the reflectivity and of the transmission to calculate, by subtracting the sum of reflectivity and transmission from 100%, the optical loss or the absorption. The result is illustrated in FIG. 4c. In the wavelength range from about 188 nm to above 202 nm, the absorption is below 2%, in the range from approximately 190 nm to approximately 202 nm it is below 1.5%, and in the range from approximately 192 nm to approximately 201 nm, the absorption is even less than 1%.

Also produced was a mirror which corresponds in principle to the embodiment illustrated in FIG. 3, wherein again the oxide layers were applied in a plasma-enhanced fashion and the fluoride layers were applied using electron beam evaporation. As the first layer stack, nine alternating layers of aluminum oxide and silicon dioxide, beginning with aluminum oxide, were applied on a substrate made of quartz glass. As the first sub-stack of the second layer stack, six periods of a sequence of magnesium fluoride, silicon dioxide and aluminum oxide were applied. Finally, as the second sub-stack of the second layer stack, three periods of a sequence of magnesium fluoride and silicon dioxide, beginning with magnesium fluoride, were applied. The ratio of the number of magnesium fluoride layers to the total number of the layers over the entire dielectric coating was approximately 0.28. The layer thicknesses were likewise optimized using conventional simulation programs for a maximum reflectivity at 193 nm. It should be pointed out that in the context of these optimizations some individual layers can be significantly thicker or thinner than remaining layers of the same type, and it is also possible, in exceptional cases, for an individual layer in the inside of layer stacks to be omitted.

Figure 5A:
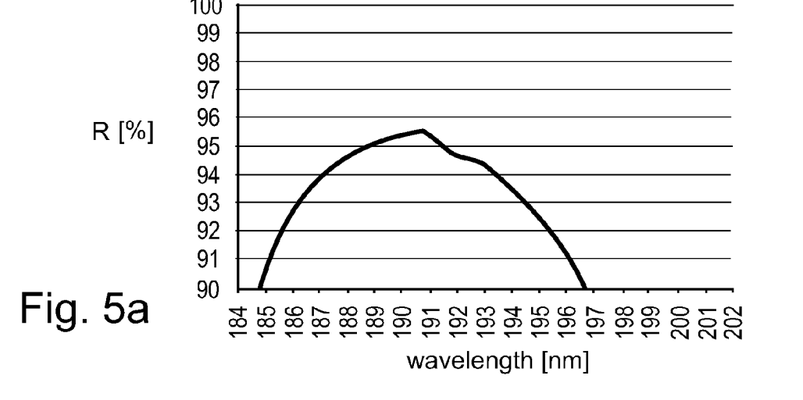
FIGS. 5a-c show the measurement of the reflectivity and of the transmission in a mirror according to the third embodiment and the determination of its absorption as a function of the wavelength.
Figure 5B:
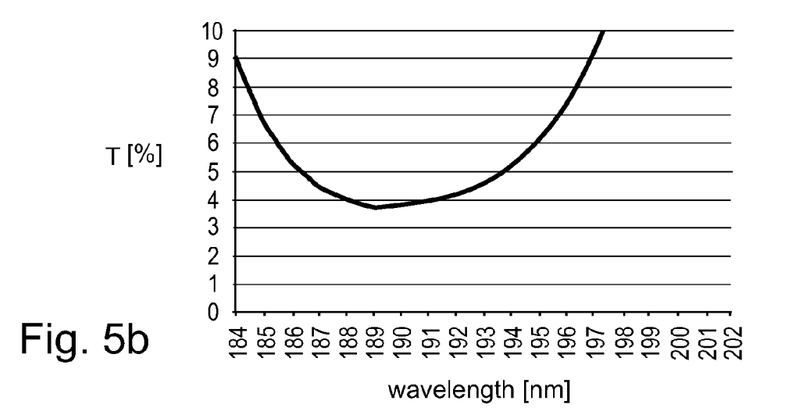
Figure 5C:
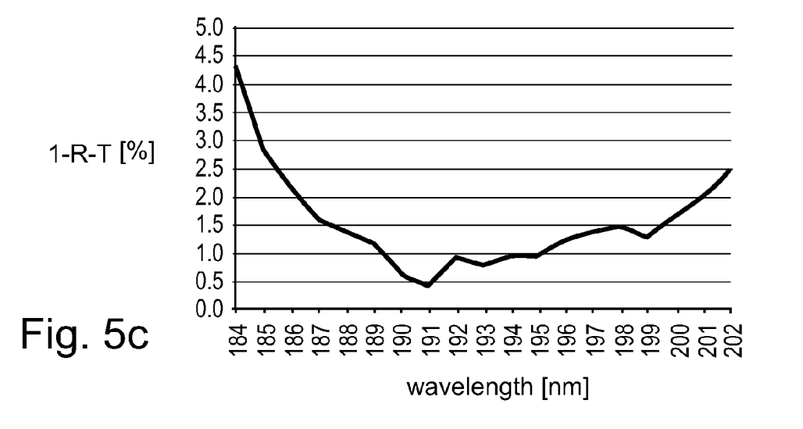

The reflectivity and the transmission were measured with substantially normal incidence in the wavelength range from 184 nm to 202 nm. The results are illustrated in FIGS. 5a,b. Therefrom, the absorption was also ascertained as described above (see FIG. 5c). In a range between approximately 186 nm and approximately 195 nm, a reflectivity of 93% and more was achieved, in a range between approximately 187 nm and approximately 194 nm, a reflectivity of 94% and more was achieved, in a range between about 189 nm and about 192 nm, a reflectivity of 95% and more was achieved with a maximum of just under 95.7% at approximately 191 nm. The transmission drops to just under 4% only in a range between approximately 188 nm and approximately 191 nm. At 193 nm, it is even possible to achieve transmission of almost 5%. In this mirror, a significantly higher transmission is thus achieved at 193 nm than in the previous mirror. In the wavelength range from approximately 186 nm to approximately 201 nm, the absorption is under 2%, in the range from approximately 187 nm to approximately 200 nm, it is under 1.5%, and in the range from approximately 189 nm to approximately 195 nm, the absorption is even less than 1%.

Figure 6:
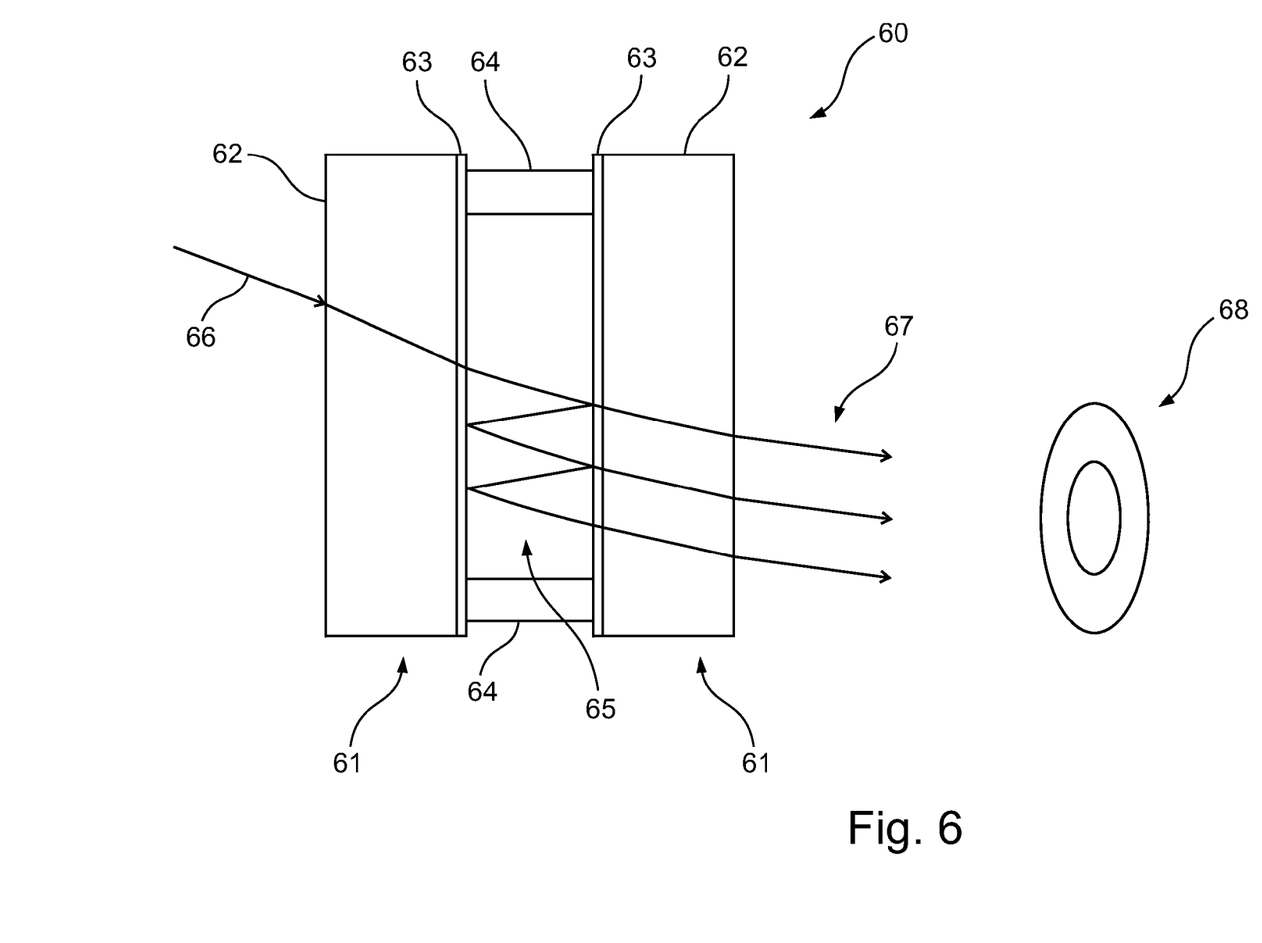
FIG. 6 schematically shows a schematic diagram of an etalon of two mirrors with dielectric coating.

FIG. 6 illustrates schematically a schematic diagram of an etalon 60 of two mirrors 61 with a substrate 62 and a dielectric coating 63 as described above. The two mirrors 61 are planar and arranged parallel with respect to one another, wherein the distance between them is defined by spacers 64. Located between the two reflective surfaces 63 of the mirrors 61 is an air gap 65, the width of which defines the wavelength at which the emerging partial rays 67 interfere to form an interference pattern 68. The partial rays 67 are produced with each reflection of the partial ray 66 that enters the etalon 60 at the dielectric coatings 63 of the mirrors 61. For the sake of clarity, only the emerging partial rays 67 to one side are illustrated. The higher the number of times the partial ray 66 is reflected to and fro in the air gap 65 of the etalon 60 between the two mirrors 61 due to high reflectivity of the dielectric coatings 63, the more emerging partial rays 67 are formed and the higher the resolution of the wavelength of the partial ray 66. By way of the still high transmission it is ensured that the intensity of the emerging partial rays 67 is as high as possible, which likewise increases the accuracy of the measurement of the wavelength.

The partial ray 66 can for example be branched off from the radiation emitted by a laser in order to check the wavelength of the laser. If the control measurement, which can take place continuously with respect to the laser operation, determines a deviation from the predefined wavelength that is too great, the operating parameters of the laser can be readjusted. A highly precise wavelength, as can be ensured by lasers with an etalon as described here, is significant inter alia in UV lithography at wavelengths between 157 nm and 365 nm.

The above description of the preferred embodiment has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

The invention claimed is:

1. A mirror comprising:
   a substrate, and
   a dielectric coating having a total number of layers on the substrate and having exactly two layer stacks, a first of the layer stacks arranged on the substrate and comprising layers of high refractive index and low refractive index oxides in alternating arrangement, and a second of the layer stacks arranged on the first layer stack and comprising layers of fluorides and oxides in alternating arrangement,
   wherein the number of fluoride layers as a proportion of the total number of layers of the dielectric coating is less than 0.45, and
   wherein a coefficient of thermal expansion of the substrate is substantially similar to a coefficient of thermal expansion of the first layer stack.

2. The mirror as claimed in claim 1 and having an absorption of less than 2%.

3. The mirror as claimed in claim 1 and having a maximum reflectivity between 93% and 97%.

4. The mirror as claimed in claim 1, wherein the substrate is made of quartz glass.

5. The mirror as claimed in claim 1, wherein the fluoride layers in the second layer stack consist of low refractive index fluorides.

6. The mirror as claimed in claim 1, wherein the fluoride layers consist of magnesium fluoride and the oxide layers consist of at least one of aluminum oxide and silicon dioxide.

7. The mirror as claimed in claim 1, wherein the second layer stack consists of two sub-stacks, wherein the first sub-stack consists of alternating layers of a fluoride and of a first oxide, and the second sub-stack consists of alternating layers of the fluoride and of a second oxide.

8. The mirror as claimed in claim 7, wherein at least one of the first oxide or the second oxide comprises silicon dioxide.

9. The mirror as claimed in claim 1, wherein the second layer stack consists of two sub-stacks, wherein the first sub-stack consists of alternating layers of a fluoride and of two oxides, and the second sub-stack consists of alternating layers of the fluoride and one of the two oxides.

10. The mirror as claimed in claim 9, wherein at least one of the first oxide or the second oxide comprises silicon dioxide.

11. The mirror as claimed in claim 1, wherein the dielectric coating consists of the first and second layer stacks.

12. The mirror as claimed in claim 1, wherein a layer that is most remote from the substrate consists of a layer of aluminum oxide.

13. An etalon comprising two plane-parallel mirrors, each of the mirrors configured as claimed in claim 1.

14. The mirror as claimed in claim 1, wherein the number of fluoride layers as a proportion of the total number of layers of the dielectric coating is less than 0.35.

15. The mirror as claimed in claim 1, wherein the number of fluoride layers as a proportion of the total number of layers of the dielectric coating is less than 0.30.

16. The mirror as claimed in claim 1, wherein the oxides of the second layer stack comprise silicon dioxide.

17. A mirror comprising:
   a substrate, and
   a dielectric coating having a total number of layers on the substrate and having exactly two layer stacks, a first of the layer stacks arranged on the substrate and comprising layers of high refractive index and low refractive index oxides in alternating arrangement, and a second of the layer stacks arranged on the first layer stack and comprising layers of fluorides and oxides in alternating arrangement,
   wherein the number of fluoride layers as a proportion of the total number of layers of the dielectric coating is less than 0.45, and
   wherein the oxides of the second layer stack comprise silicon dioxide.

18. A mirror comprising:
   a substrate, and
   a dielectric coating having a total number of layers on the substrate and having exactly two layer stacks, a first of the layer stacks arranged on the substrate and comprising layers of high refractive index and low refractive index oxides in alternating arrangement, and a second of the layer stacks arranged on the first layer stack and comprising layers of fluorides and oxides in alternating arrangement,
   wherein the number of fluoride layers as a proportion of the total number of layers of the dielectric coating is less than 0.45,
   wherein the second layer stack consists of two sub-stacks, wherein the first sub-stack consists of alternating layers of a fluoride and of a first oxide, and the second sub-stack consists of alternating layers of the fluoride and of a second oxide, and
   wherein at least one of the first oxide or the second oxide comprises silicon dioxide.

* * * * *